(12) United States Patent
Hong et al.

(10) Patent No.: US 6,901,204 B2
(45) Date of Patent: May 31, 2005

(54) MICROELECTROMECHANICAL SYSTEM (MEMS) VARIABLE OPTICAL ATTENUATOR

(75) Inventors: Yoon Shik Hong, Kyungki-do (KR); Sang Kee Yoon, Suwon (KR); Suk Kee Hong, Seoul (KR); Young Gyu Lee, Suwon (KR); Sung Cheon Jung, Suwon (KR); Jung Hyun Lee, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 151 days.

(21) Appl. No.: 10/610,756

(22) Filed: Jul. 2, 2003

(65) Prior Publication Data

US 2004/0126081 A1 Jul. 1, 2004

(30) Foreign Application Priority Data

Dec. 26, 2002 (KR) ................. 10-2002-0084501

(51) Int. Cl.⁷ .............. G02B 6/00; G02B 6/26; G02B 6/42; G02B 26/08; G02B 26/00
(52) U.S. Cl. ................. 385/140; 385/14; 385/15; 385/25; 385/39; 385/40; 385/134; 359/196; 359/198; 359/209; 359/223; 359/224; 359/227; 359/230; 359/237; 359/245; 359/269
(58) Field of Search .................. 385/1–2, 4, 8–9, 385/14–15, 25, 27, 31, 39–40, 48, 134, 140; 359/196, 198, 209–212, 223–224, 227, 230, 237, 245, 247, 263, 269, 290

(56) References Cited

U.S. PATENT DOCUMENTS

| | | | | |
|---|---|---|---|---|
| 5,923,798 A | * | 7/1999 | Aksyuk et al. ............. 385/19 |
| 6,031,946 A | * | 2/2000 | Bergmann et al. ........... 385/18 |
| 6,144,794 A | * | 11/2000 | Mao et al. .................. 385/140 |
| 6,229,640 B1 | * | 5/2001 | Zhang ........................ 359/290 |
| 6,246,826 B1 | * | 6/2001 | O'Keefe et al. ........... 385/140 |
| 6,275,320 B1 | * | 8/2001 | Dhuler et al. .............. 359/237 |
| 6,303,885 B1 | * | 10/2001 | Hichwa et al. ............. 200/181 |
| 6,351,580 B1 | * | 2/2002 | Dhuler et al. .............. 385/19 |
| 6,377,718 B1 | * | 4/2002 | Que et al. ...................... 385/3 |
| 6,388,359 B1 | * | 5/2002 | Duelli et al. ............... 310/309 |
| 6,404,969 B1 | * | 6/2002 | Tayebati et al. ........... 385/140 |
| 6,459,845 B1 | * | 10/2002 | Lee et al. ................... 385/140 |
| 6,552,839 B1 | * | 4/2003 | Hong et al. ................ 359/290 |
| 6,775,459 B2 | * | 8/2004 | Hong et al. ................ 385/140 |
| 6,801,682 B2 | * | 10/2004 | Zhang et al. ................. 385/18 |
| 2003/0027370 A1 | * | 2/2003 | Helin ............................ 438/50 |
| 2003/0063891 A1 | * | 4/2003 | Kim ............................ 385/140 |
| 2004/0126080 A1 | * | 7/2004 | Hong et al. ................. 385/140 |
| 2004/0264907 A1 | * | 12/2004 | Lee et al. .................... 385/140 |

* cited by examiner

Primary Examiner—Brian Healy
Assistant Examiner—Ryan Lepisto
(74) Attorney, Agent, or Firm—Lowe Hauptman & Berner LLP (57) ABSTRACT

Disclosed is an MEMS variable optical attenuator comprising a substrate having a planar surface, optical fibers having an optical signal transmitting end and an optical signal receiving end, respectively, coaxially arranged on the substrate, a micro-electric actuator arranged on the substrate for providing a driving stroke along a direction perpendicular to an optical axis of the optical beam, at least one lever structure arranged on the substrate for receiving the driving stroke of the micro-electric actuator at a first end thereof and transferring an amplified displacement distance to an optical shutter through a second end thereof, an optical shutter arranged on the substrate and connected to the second end of the lever structure so as to be moved by the amplified displacement distance, thereby being displaced to an attenuation position of the optical beam.

20 Claims, 8 Drawing Sheets

PRIOR ART
FIG. 1a

PRIOR ART

MICROELECTROMECHANICAL SYSTEM (MEMS) VARIABLE OPTICAL ATTENUATOR

BACKGROUND OF THE INVENTION

1. Field of the Invention

The present invention relates to an optical attenuator that uses an element of a micro-electro-mechanical system (MEMS) device, and more particularly to an MEMS variable optical attenuator capable of amplifying a displacement distance of an optical shutter so that the displacement distance is compatible with a large mode field diameter (MFD) of an optical signal transmitting end or an optical signal receiving end of an optical fiber.

2. Description of the Related Art

An optical attenuator is an optical component for use in optical telecommunication networks. The optical attenuator includes a pair of optical waveguides having an optical signal transmitting end and an optical signal receiving end, respectively, and attenuates an optical power of an optical beam passing out the transmitting end of the optical waveguide and entering the receiving end of the optical waveguide by causing insertion loss of the optical beam.

Generally, optical power levels are regulated over wide ranges based on a configuration of optical telecommunication systems. For example, the optical power levels are determined by an optical transmission loss typically varied based on a length of an optical transmission line, the number of connection points of optical fibers, and the number and performance of optical components such as optical couplers coupled to the optical transmission line. An optical attenuator is needed in optical telecommunication networks to reduce an optical power when an optical signal with a excessive power level greater than an allowed power level is received by an optical signal receiver. The optical attenuator further may be used in evaluating, adjusting and correcting telecommunication equipments and optical measurement equipments.

Such optical attenuators are classified into two types, a fixed optical attenuator for reducing an optical power by a fixed amount of attenuation and a variable optical attenuator capable of attenuating an optical power of incident light beams by a varied amount of attenuation based on user's requirements. Such optical attenuators are required to be produced at low cost with high reliability and small size.

To satisfy such requirements, an optical attenuator that uses an element of an MEMS device has been suggested. Such MEMS optical attenuator is realized by forming a microstructure acting as an actuator on a substrate such as silicon by using a thin film processing technology. Generally, an MEMS actuator is driven to move by a driving force caused by thermal expansion or an electrostatic force. As the MEMS actuator moves, an optical shutter coupled to the MEMS actuator is displaced so as to be inserted into a gap between two optical waveguides, thereby partially intercepting optical beams traveling from an optical signal transmitting end (or an exit end) of the optical waveguide such as an optical fiber to an optical signal receiving end (or an incident end) of the optical waveguide.

Figure 1A:
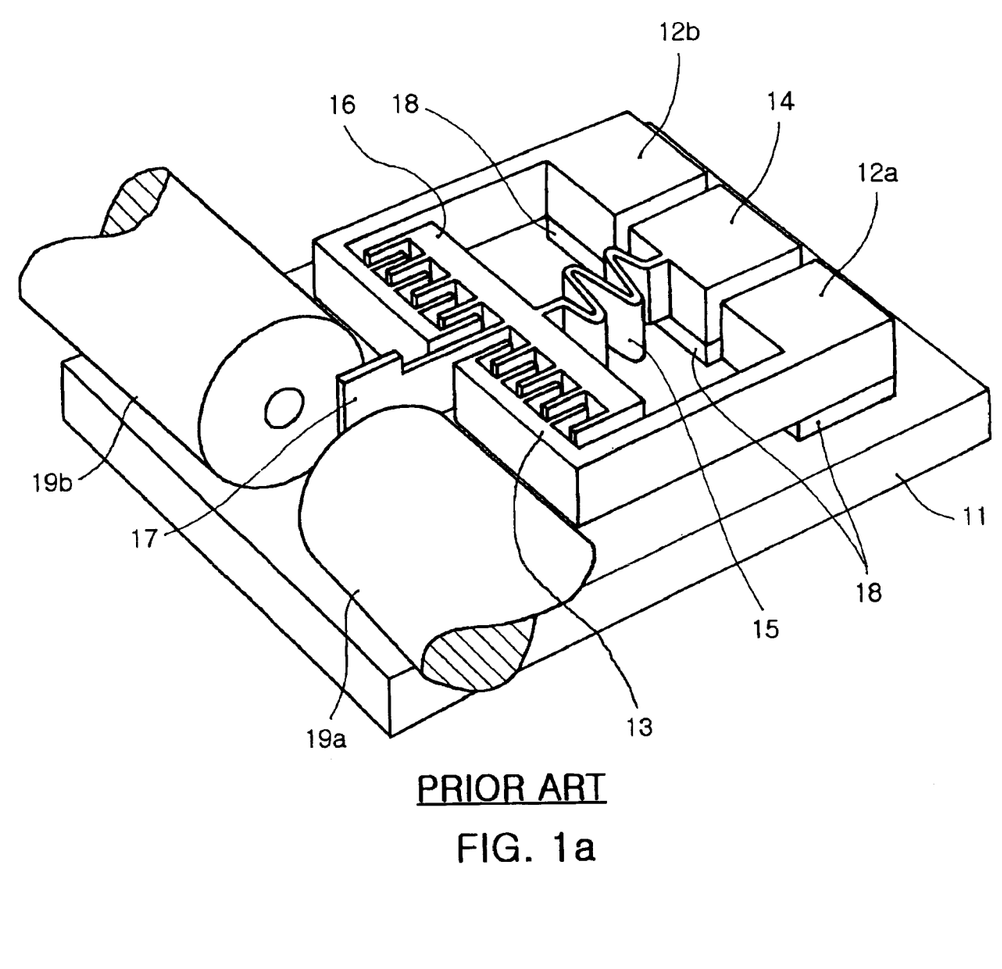
FIGS. 1A and 1B illustrate a perspective view and a plan view of a conventional MEMS variable optical attenuator, respectively.
Figure 1B:
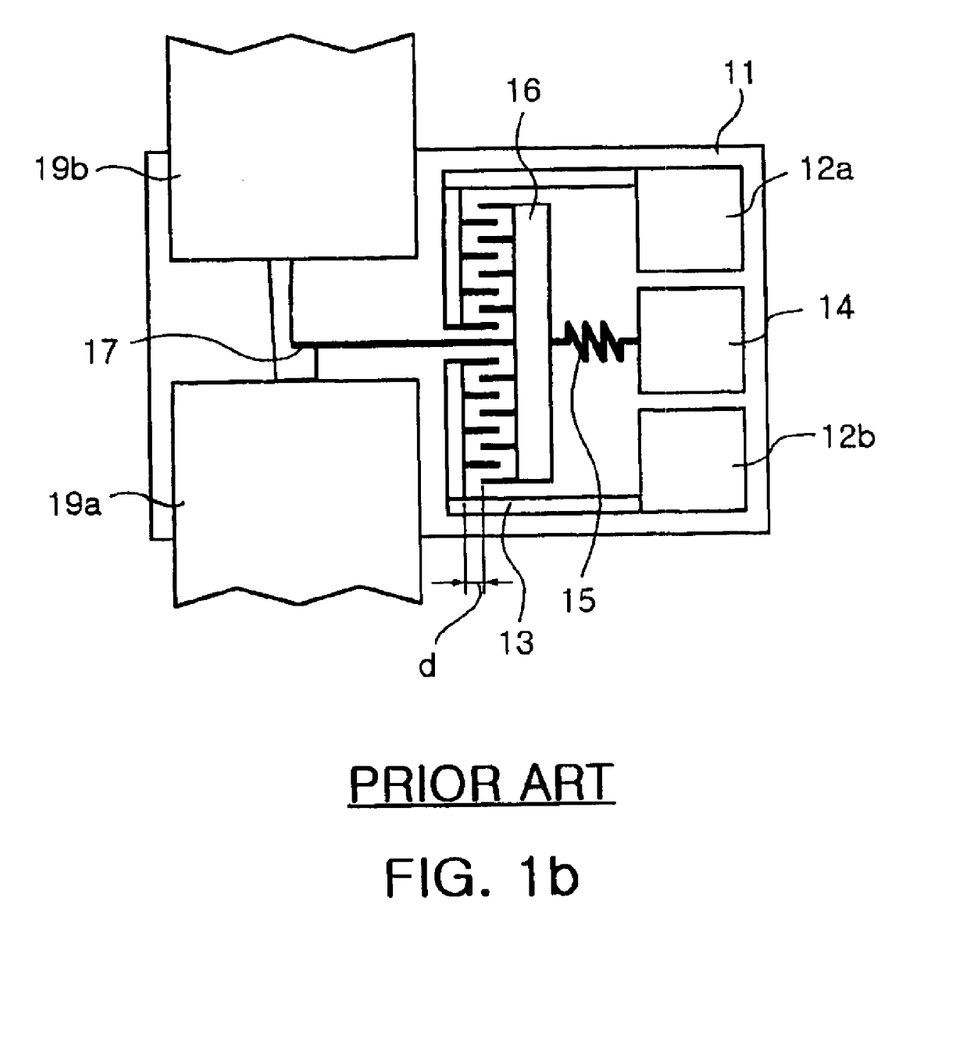

FIGS. 1A and 1B illustrate a perspective view and a plan view, respectively, of a conventional variable optical attenuator using an actuator driven by an electrostatic force.

Referring to FIGS. 1A and 1B, an MEMS variable optical attenuator includes a substrate having a pair of optical waveguides 19a, 19b provided thereon, wherein one waveguide has an optical signal transmitting end and the other has an optical signal receiving end, an electrostatic actuator comprised of driving electrodes 12a, 12b, a ground electrode 14, a spring 15 and a movable mass 16, and an optical shutter 17 connected to the movable mass 16 of the electrostatic actuator.

The driving electrodes 12a, 12b and the ground electrode 14 are supported by an oxide layer called an "anchor" and formed on the substrate 11, and thereby fixed to the substrate 11. The movable mass 16 is connected to the ground electrode 14 via the spring 15 and has a comb shape. The driving electrodes 12a, 12b have respective extended portions 13a, 13b, each with a comb shape. The comb of each of the extended portions 13a, 13b is interdigitated with the comb of the movable mass 16.

When driving signals are applied to the driving electrodes 12a, 12b so as to generate a potential difference between the driving electrodes 12a, 12b and the ground electrode 14, an electrostatic force arises between the interdigitated combs of movable mass 16 and extended portions 13a, 13b, thereby causing the movable mass 16 to move. As the movable mass 16 moves, the optical shutter 17 is inserted into a gap defined by the optical signal transmitting end 19a and the optical signal receiving end 19b so as to partially intercept optical beams incident onto the optical shutter 17.

Advantageously, optical waveguides are optical fibers. To improve optical performance of the optical fibers, an optical collimator can be used. The optical collimator enlarges a mode field diameter of the optical fiber, thereby reducing alignment loss of optical beams, amount of variation of wavelength dependence loss (WDL) and polarization dependence loss (PDL) of light beams, reflection loss and initial insertion loss of light beams. As a result, it is possible to achieve a superior optical performance of the optical fiber.

However, even though the optical collimator has such advantages as described above, it cannot be adopted in a conventional MEMS variable optical attenuator due to its large mode field diameter (MFD). The conventional MEMS variable optical attenuator is provided with an actuator having a driving stroke of about 10 $\mu$m which is compatible with a MFD of a typical optical fiber. However, in the case of using an optical collimator, a MFD of the optical fiber increases to 100 $\mu$m, or to 200–300 $\mu$m under certain circumstances, so that it is difficult to achieve an adequate attenuation level of the incident light beams by using the conventional MEMS actuator having a short driving stroke.

To solve the above problem, it is necessary to lengthen the actuator's driving stroke so that a displacement distance of an optical shutter increases, but there is a limit to lengthening a driving stroke of an actuator because an MEMS variable optical attenuator is implemented in a very small sized chip. In a conventional MEMS variable optical attenuator, a driving stroke of an actuator is limited by a gap "d" defined by two facing combs, a comb of the movable mass 16 and a comb of the extended portions 13a, 13b of the driving electrodes 12a, 12b. Accordingly, if the driving stroke of the actuator is lengthened to be compatible with the MFD of the optical collimator only by using the gap "d", it cannot satisfy the need for a small sized MEMS optical variable attenuator.

Accordingly, to realize an MEMS variable optical attenuator having an excellent optical performance and a small size, it is necessary to modify a structure of an MEMS actuator so that a driving stroke of the MEMS actuator can be amplified to be compatible with a large MFD of an optical collimator.

SUMMARY OF THE INVENTION

Therefore, the present invention has been made in view of the above problems, and it is an object of the present invention to provide an MEMS variable optical attenuator provided with an actuator capable of providing an optical shutter with a large displacement distance greater than a driving stroke of the actuator by using a lever so that the displacement distance of the optical shutter may be compatible with a large mode field diameter of a collimator, thereby achieving a desired amount of attenuation of a optical power.

In accordance with the present invention, the above and other objects can be accomplished by the provision of an MEMS variable optical attenuator comprising a substrate having a planar surface, optical fibers having an optical signal transmitting end and an optical signal receiving end, respectively, coaxially aligned with each other on the substrate, a micro-electric actuator arranged on the substrate for providing a driving stroke in a direction perpendicular to an optical axis of an optical beam, at least one lever structure arranged on the substrate for receiving the driving stroke of the micro-electric actuator at a first end thereof and providing an optical shutter with a displacement distance which is greater than the driving stroke through a second end thereof, an optical shutter arranged on the substrate and connected to the second end of the lever structure so as to be moved by the amplified displacement distance, thereby being displaced to an attenuation position of the optical signal.

In accordance with one aspect of the present invention, there is provided an MEMS variable optical attenuator comprising a substrate having a planar surface, optical fibers having an optical signal transmitting end and an optical signal receiving end, respectively, coaxially arranged on the substrate, an electrostatic electrode section fixed on the substrate and generating an electrostatic force in response to an electronic input signal and, a movable mass arranged on the substrate and moving by the electrostatic force in a direction perpendicular to an optical axis, a ground electrode section fixed on the substrate and connected to the movable mass by a first elastic structure, a lever structure arranged in perpendicular to a moving direction of the movable mass and having a first end connected to the movable mass via a second elastic structure and a second end opposite to the first end, a supporting structure arranged on an opposite side of the movable mass with respect to the lever structure and connected to a portion of the lever structure by a third elastic structure, the portion being near the first end of the lever structure, and an optical shutter arranged on the substrate and connected to the second end of the lever structure.

In accordance with another aspect of the present invention, there is provided with an MEMS variable optical attenuator comprising a substrate having a planar surface, optical fibers having an optical signal transmitting end and an optical signal receiving end, respectively, coaxially aligned with each other on the substrate, an electrostatic electrode section fixed on the substrate and generating an electrostatic force in response to the electronic input signal, a movable mass arranged on the substrate and moving by the electrostatic force, two ground electrodes arranged at both sides of the movable mass and connected to the movable mass by respective first elastic structures, a first and second lever structures, each with a first end and a second end, which are arranged in perpendicular to a moving direction of the movable mass, the first ends of the first and second lever structures being connected to the movable mass by respective second elastic structures, a supporting structure arranged on an opposite side of the movable mass with respect to the first and second lever structures and connected to respective portions of the first and second lever structures by respective third elastic structures, the respective portions being near the respective first ends of the first and second lever structures, and an optical shutter arranged on the substrate and connected to the second ends of the first and second lever structures.

In accordance with still another aspect of the present invention, there is provided an MEMS variable optical attenuator comprising a substrate having a planar surface, optical fibers having an optical signal transmitting end and an optical signal receiving end, respectively, coaxially aligned with each other on the substrate, an electrostatic electrode section fixed on the substrate and generating an electrostatic force in response to the electronic input signal, a movable mass arranged on the substrate and being moved by the electrostatic force, two ground electrodes fixed on the substrate, arranged at both sides of the movable mass, and connected to the movable mass by respective first elastic structures, a first and second lever structures, each with a first end and a second end, arranged in perpendicular to a moving direction of the movable mass, the first ends of the first and second lever structures being connected to the movable mass by respective second elastic structures, two supporting structures arranged on an opposite side of the movable mass with respect to the first and second lever structures and connected to respective portions of the first and second lever structures by respective third elastic structures, the respective portions being near the respective first ends of the first and second lever structures, and an optical shutter arranged on the substrate and connected to the second ends of the first and second lever structures.

Preferably, the movable mass includes an extended structure which is arranged in parallel with the first and second lever structures and has a length which is almost equal to the total lengths of the first and second lever structures, and the first ends of the first and second lever structures are connected to the movable mass by the third elastic structures.

Preferably, each of the movable mass and the electrostatic electrode section has a comb shape and the combs are interdigitated with each other.

The MEMS variable optical attenuator in accordance with the present invention is capable of attenuating the optical power of the optical beam by a desired amount of attenuation even in the case that an optical collimator is provided to the optical signal transmitting end or the optical signal receiving end of the optical fiber.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

A detailed description of an MEMS variable optical attenuator in accordance with preferred embodiments of the present invention will be given below with reference to the accompanying drawings.

Figure 2:
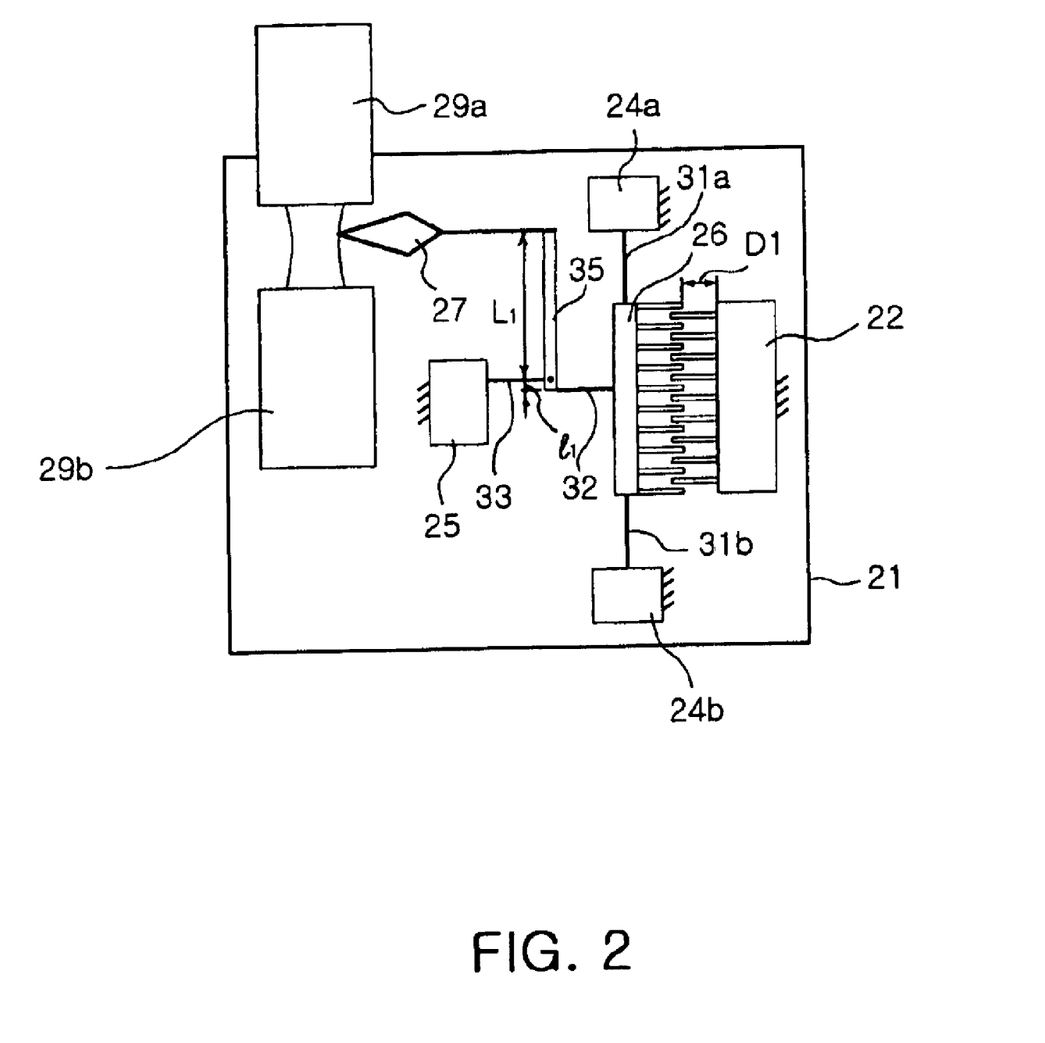
FIG. 2 illustrates a plan view of an MEMS variable optical attenuator in accordance with a first embodiment of the present invention.

FIG. 2 illustrates a plan view of an MEMS variable optical attenuator in accordance with a first embodiment of the present invention.

Referring to FIG. 2, an MEMS variable optical attenuator in accordance with a first embodiment of the present invention includes a substrate 21 having a pair of optical fibers with an optical signal transmitting end 20 and an optical signal receiving end 30, respectively, an electrostatic actuator comprised of a driving electrode 22, ground electrodes 24a, 24b and a movable mass 12, a lever structure 35 for amplifying a driving stroke of the actuator so as for an optical shutter to be displaced by a displacement distance greater than the driving stroke of the actuator, and an optical shutter 27 coupled to the lever structure 35.

The driving electrodes 12a, 12b and the ground electrode 14 are structures (hatched portion) formed over the substrate 11 and supported by an oxide layer (not shown). The movable mass 26 is connected to the ground electrodes 24a, 24b located at both sides thereof via respective first elastic structures 31a, 31b and suspended over the substrate 21. The movable mass 26 and the driving electrode 22 preferably have interdigitated comb structures to effectively generate an electrostatic force.

The first elastic structures 31a, 31b act as linear springs and allow the movable mass 26 to move along a predetermined path by a driving stroke.

In accordance with this embodiment of the present invention as described above, arranging the first elastic structures 31a, 31b at both sides of the movable 26 is advantageous in that the movable mass 26 is able to perform a precise straight line motion. However, locations and the numbers of the first elastic structures and the ground electrodes are not limited to the arrangement shown in FIG. 2. The first elastic structure can be arranged in a different position from that of FIG. 2 so as for the movable mass 26 to be returned to its original position after being displaced.

The lever structure 35 is almost perpendicular to a moving direction of the movable mass 26. The lever structure 35 has a first end connected to the movable mass 26 via a second elastic structure 32 and a second end perpendicularly coupled to the optical shutter 27.

The MEMS variable optical attenuator in accordance with the first embodiment of the present invention further includes a supporting structure 25 fixed on the substrate 21 and connected to a portion of the lever structure 35 by a third elastic structure, the portion being near to the first end of the lever structure 35 and acting as a fulcrum of a lever. The supporting structure 25 is coated with a metal which is the same material as the ground electrodes 24a, 24b, so that the supporting structure 25 may serve as an additional ground electrode. The second and third elastic structures 32, 33 function to help the lever structure 35 to operate smoothly.

In the MEMS variable optical attenuator shown in FIG. 2, if a desired electrical signal is applied to the driving electrode 22 and an elastic force arises between the driving electrodes and the ground electrodes, the movable mass is displaced toward the driving electrode 22. After the elastic force is removed or decreases, the movable mass 26 is returned to the initial position due to a restoring force of the first elastic structures 31a, 31b. The displacement distance of the movable mass is determined by a gap D1 defined by a tip of the movable mass 26 and a body of the driving electrode 22.

The driving stroke corresponding to the size of the gap D1 is transferred to the first end of the lever structure 35 through the second elastic structure 32, and thus the first end of the lever structure 35 moves by the same distance as the gap D1. As the first end of the lever structure 35 moves by the gap D1, the second end connected to the optical shutter moves by a displacement distance greater than the gap D1 because the gap D1 is amplified to the displacement distance by the lever structure 35 and the fulcrum.

As described above, as the second end of the lever structure 35 moves by the amplified displacement distance, the optical shutter 27 perpendicularly coupled to the second end of the lever structure 35 is driven to be inserted into a gap between the optical signal transmitting end and the optical signal receiving end of the optical fibers.

The amount of amplification of the displacement distance is determined by a position of the fulcrum. That is, the amount of the amplification is determined by a leverage ratio. The leverage ration is defined by a ratio of a first length l1 (from the first end to the fulcrum) of the lever structure 35 to a second length L1 (from the second end to the fulcrum) of the lever structure 35.

For example, in the case that the second length L1 is 10 times greater than the first length l1, the displacement distance of the optical shutter coupled to the second end of the lever structure 35 is amplified to 10 times the driving stroke of the movable structure 26. That is, assuming that the actuator has a driving stroke of 10–30 $\mu$m, the displacement distance of the optical shutter can be amplified to 100–300 $\mu$m. Accordingly, the displacement distance of the optical shutter can be compatible with the MFD of the optical collimator used in the MEMS variable optical attenuator.

As described above, to achieve a great amplification of the displacement distance of the optical shutter, it is desirable that the fulcrum of the lever is formed to be near the first end of the lever structure.

Figure 3:
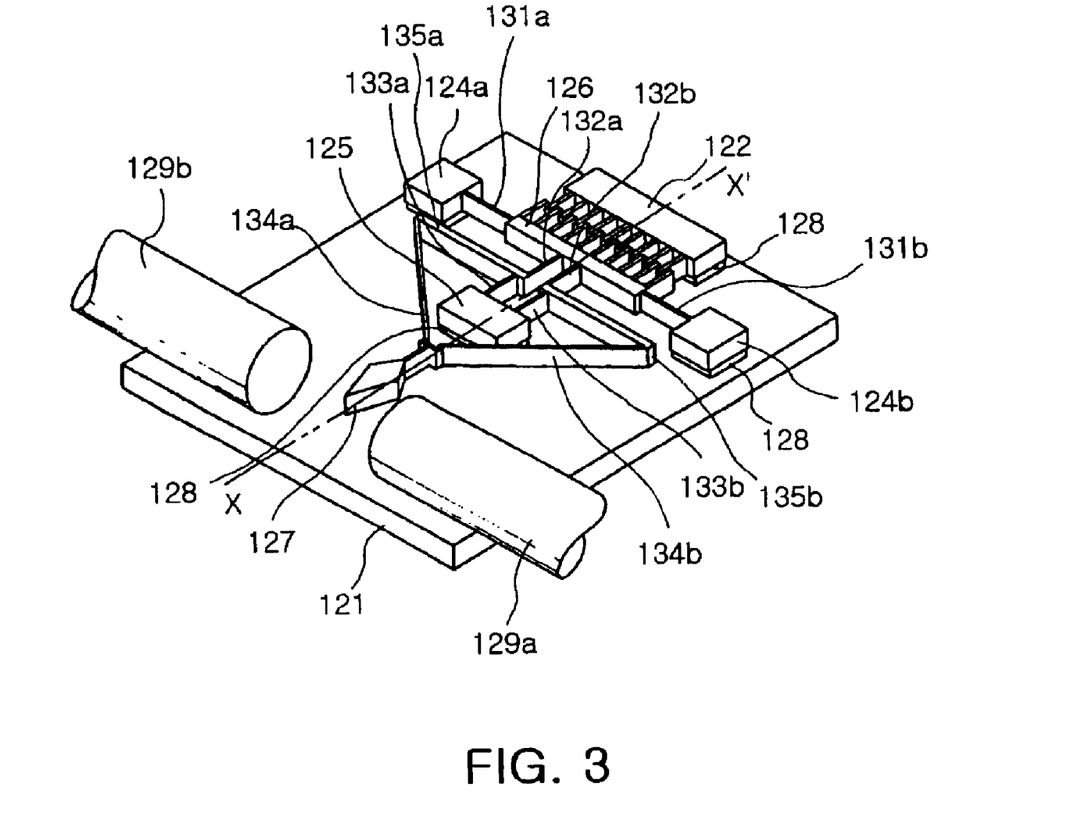
FIG. 3 illustrates a perspective view of an MEMS variable optical attenuator in accordance with a second embodiment of the present invention.

FIG. 3 illustrates a perspective view of an MEMS variable optical attenuator according to a second embodiment of the present invention. The MEMS variable optical attenuator in accordance with the second embodiment of the present invention includes two lever structures bilaterally symmetrically arranged.

Referring to FIG. 3, an MEMS variable optical attenuator of the second embodiment of the present invention includes a substrate having optical fibers with a transmitting end 129a and a receiving end 129b, respectively, thereon, an electrostatic actuator comprised of a driving electrode 122, ground electrodes 124a, 124b and a movable mass 126, two lever structures 135a, 135b which are bilaterally symmetrically arranged, and an optical shutter 127 coupled to the lever structures 135a, 135b.

The driving electrode 122 and the ground electrodes 124a, 124b are supported by an oxide layer 128 and fixed on the substrate 121 in similar manner to the MEMS variable optical attenuator shown in FIG. 2. The movable mass 126 is connected to the ground electrodes 124a, 124b arranged at both sides thereof by first elastic structures 131a, 131b, respectively, and suspended over the substrate 121. The first elastic structures 131a, 131b act as linear springs, thereby enabling the movable mass 126 to move along a predetermined path by a driving stroke.

The first and second lever structures 135a, 135b are arranged in perpendicular to a moving direction of the movable mass 126, and first ends thereof are aligned on the same straight line and adjacent to the other. The first ends of the first and second lever structures 135a, 135b are connected to movable mass 126 by second elastic structures 132a, 132b, respectively.

The first lever structure 135a has a fulcrum at a portion close to the first end thereof. The second lever structure 135b has a fulcrum at a portion close to the first end thereof. The portions near the first and second lever structures 135a, 135b are connected to a supporting structure 125 fixed on the substrate 121 by third elastic structures 133a, 133b, respectively. The supporting structure 125 is coated with a metal which is the same material as the ground electrodes 124a, 125b, thereby serving as a ground electrode.

Second ends of the first and second lever structures 135a, 135b are connected to the optical shutter 127 by third elastic structures 133a, 133b, respectively. Further, the lever structures 135a, 135b are bilaterally symmetrically arranged at both sides of a virtual line X–X' connecting the optical shutter 127 and the center of the movable mass 126.

Figure 4A:
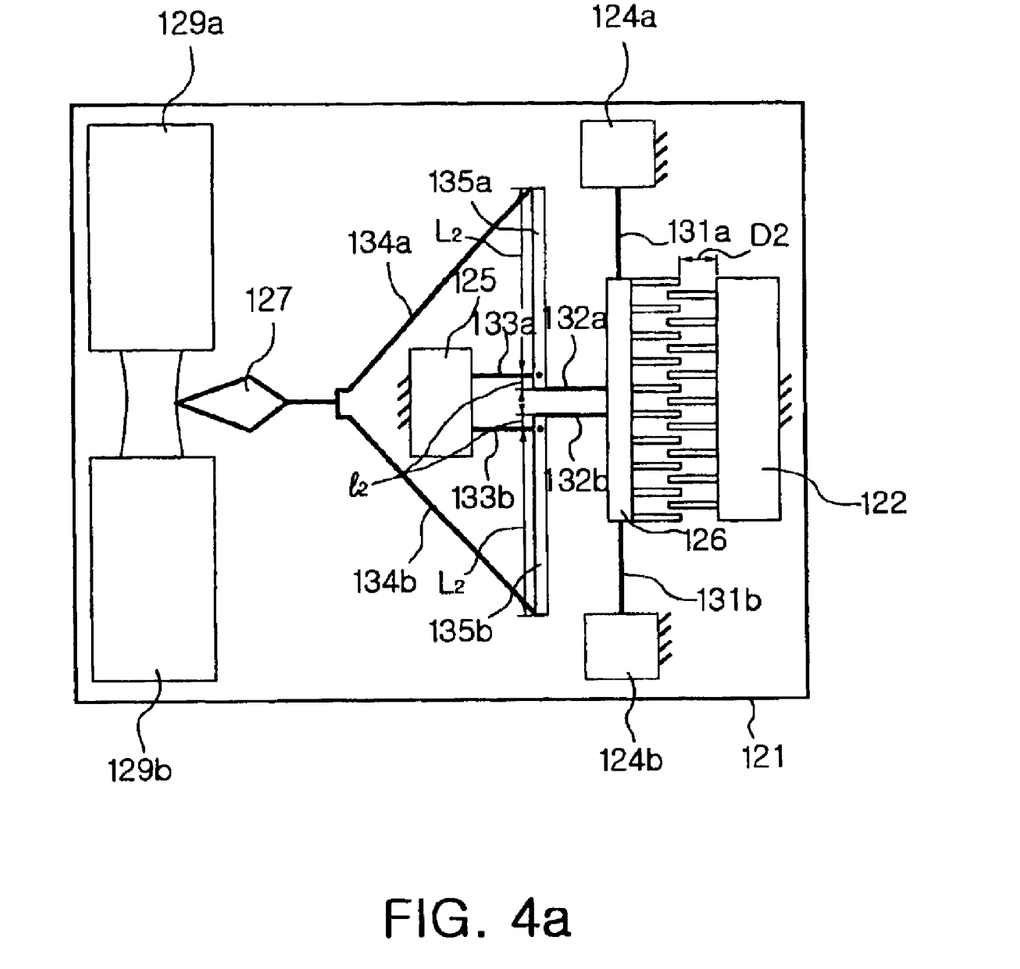
FIGS. 4A and 4B illustrate plan views showing the operation of the MEMS variable optical attenuators of the first and second embodiments of the present invention, respectively.
Figure 4B:
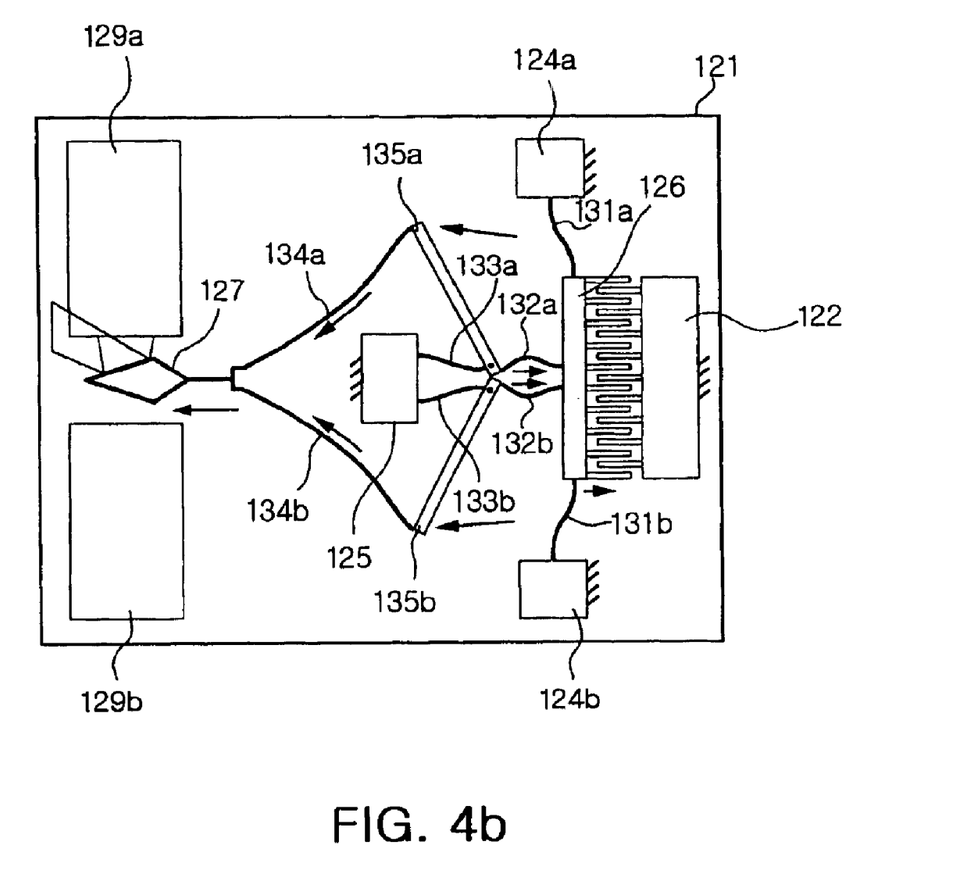

FIGS. 4A and 4B are plan views showing the operation of the MEMS variable optical attenuator shown in FIG. 3.

FIG. 4A illustrates the MEMS variable optical attenuator in which electrical signals corresponding to the amount of attenuation of optical beams are not applied to the driving electrode 122. As explained with reference to FIG. 3, the movable mass 126 is connected to the ground electrodes 124a, 124b by the respective first elastic structures and moves along a straight path perpendicular to an optical axis of optical fibers. The first ends of the first and second lever structures 135a, 135b are connected to the movable mass 126 by the second elastic structures 132a, 132b, respectively, and the second ends of the first and second lever structures 135a, 135b are connected to the optical shutter 125 by fourth elastic structures 134a, 134b, respectively. The portions of the first and second lever structures 135a, 135b, which are close to the first ends of the first and second lever structures are connected to the supporting structure 125 by third elastic structures 133a, 133b, respectively, thereby serving as fulcrums. When the electronic signal corresponding to the amount of the attenuation of optical beams is applied to the driving electrode, an elastic force arises between the driving electrode and the ground electrodes, so that the movable mass 126 moves toward the driving electrode 122 as shown in FIG. 4B. Along the moving direction of the movable mass 126, the first ends of the first and second lever structures 135a, 135b move by a distance that is the same as a driving stroke of the movable mass 126. As soon as the first ends of the first and second lever structures 135a, 135b move, the second ends of the first and second lever structures 135a, 135b move in an opposite direction to the moving direction of the first ends. That is, the second ends of the first and second lever structures move toward the optical axis of an optical beam. The displacement distances of the second ends of the first and second lever structures 135a, 135b are increased by a leverage force exerted by the lever structures 135a, 135b and the fulcrums by an amount obtained by multiplying the driving stroke of the movable mass by a leverage ratio, wherein the leverage ratio is defined as a ratio of a first length l2, from the first ends of the lever structures 135a, 135b to the fulcrums, to the a second length L2, from the second ends of the lever structures 135a, 135b to the fulcrums.

Accordingly, the optical shutter 127 moves by a displacement distance greater than that of the movable mass 126, in which the displacement distance of the movable mass 126 is defined by a gap between the movable mass 126 and the driving electrode 122.

Particularly, by connecting the optical shutter 127 to the second ends of the two lever structures 135a, 135b, the optical shutter 127 moves in a direction perpendicular to the optical axis of the optical signal transmitting end 129a and the optical signal receiving end 129b.

In accordance with the first and second embodiment of the present invention, the movable mass and the driving electrode have a comb shape so as to increase an elastic force generating area. In the case that the movable mass and the driving electrodes have the comb shape, the elastic force generating area is larger than when the driving electrode and the movable mass have a flat panel shape. However, the MEMS variable optical attenuator in accordance with the present invention will be modified in various shapes. That is, the movable mass and the driving electrode can be formed to have shapes other than a comb shape.

Figure 5:
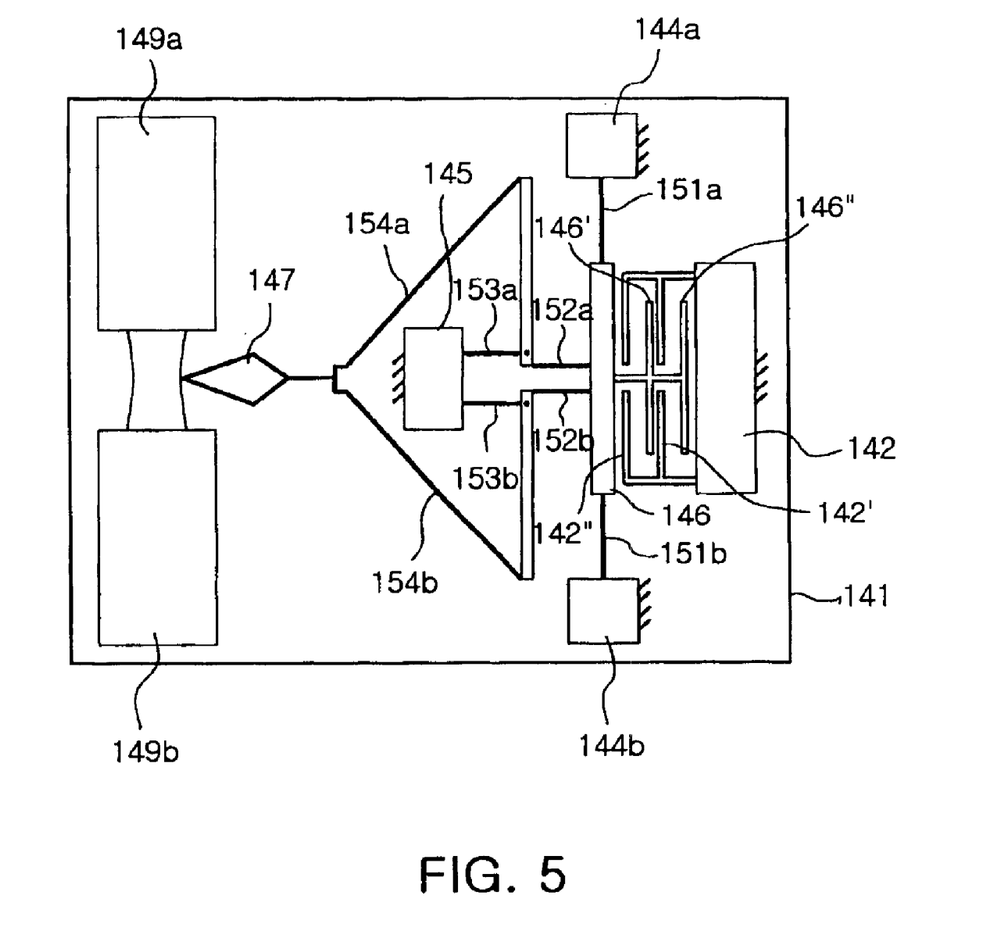
FIG. 5 illustrates a plan view of an MEMS variable optical attenuator having an improved movable mass and driving electrodes in accordance with the present invention.

Another example shape of the movable mass and the driving electrode is disclosed in FIG. 5.

Referring to FIG. 5, other elements except for the movable mass and the driving electrode are the same as the MEMS variable optical attenuator shown in FIG. 3. A movable mass 146 is connected to ground electrodes 144a, 144b by first elastic structures 151a, 151b, respectively. First ends of a first and a second lever structures 155a, 155b are connected to the movable mass 146 by second elastic structures 152a, 152b, and second ends of the first and second lever structures 155a, 155b are connected to an optical shutter 147 by fourth elastic structures 154a, 154b, respectively.

Further, a portion of the first lever structure 155a is connected to a supporting structure 145 by a third elastic structure 153a and a portion of the second lever structure 155b is connected to the supporting structure 145 by a third elastic structure 153b. The portions connected to the supporting structure 145 act as fulcrums of a lever, wherein the portions are near the first ends of the lever structures 135a, 135b.

In this embodiment, the movable mass 146 has two extended portions 146', 146" arranged in parallel with a body of the movable mass 146, which extend toward the driving electrode 142. The driving electrode 142 has extended portions 142', 142" arranged in parallel with a body of the driving electrode 142, which extend toward the movable mass 146. The extended portions 142', 142" of the driving electrode 142 do not overlap with the extended portions 146', 146" of the movable mass 146, but are positioned between the body of the movable mass 146 and the extended portions 146', 146" of the movable mass 146.

Such shapes of the movable mass 146 and the driving electrode 142 provide an increased elastic force generating area, thereby improving movement efficiency of the movable mass which is driven to move by an electrostatic force.

Figure 6:
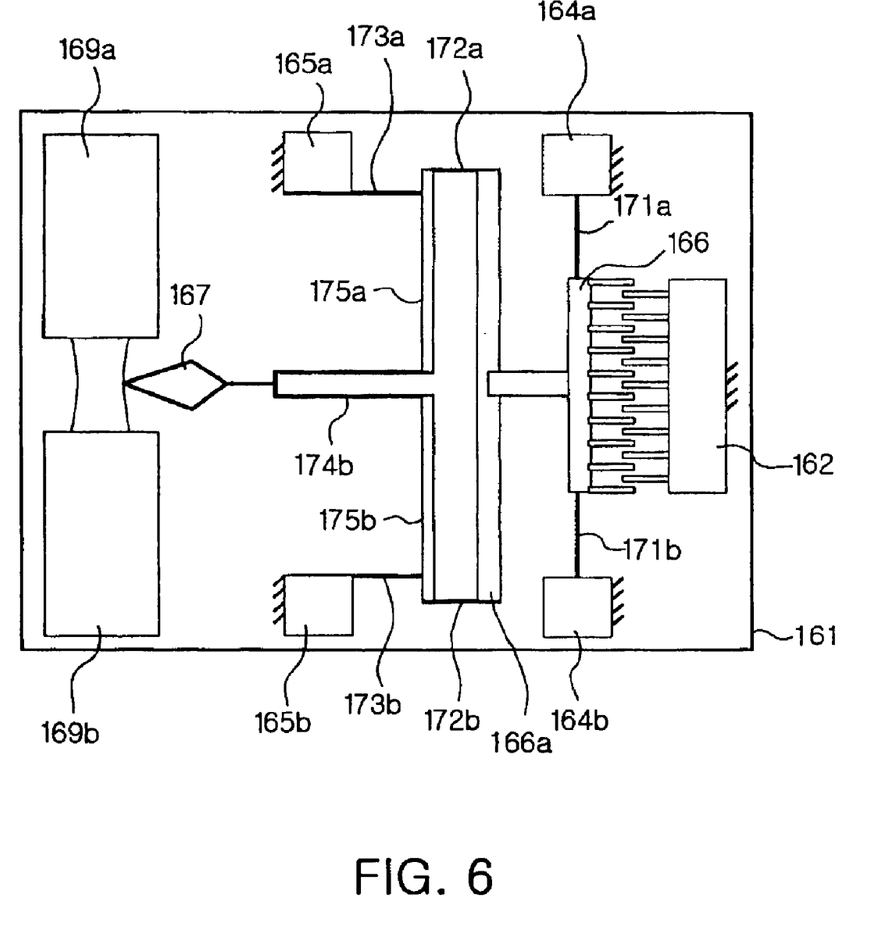
FIG. 6 illustrates a plan view of an MEMS variable optical attenuator in accordance with a third embodiment of the present invention.

FIG. 6 illustrates a plan view of an MEMS variable optical attenuator in accordance with a third embodiment of the present invention. This embodiment provides an MEMS variable optical attenuator different from the MEMS variable optical attenuator in accordance with the second embodiment of the present invention in connection of the lever structures.

The MEMS variable optical attenuator in accordance with the third embodiment of the present invention includes a substrate 161 having a pair of optical fibers with an optical signal transmitting end 169a and an optical signal receiving end 169b, respectively, an elastic actuator comprised of a driving electrode 162, ground electrodes 164a, 164b and a movable mass 166, two lever structures 175a, 175b bilaterally symmetrically arranged, and an optical shutter connected to the lever structures 175a, 175b. The driving electrode 162 is fixed on the substrate 161 and supported by an oxide layer 168 formed on the substrate 161. The movable mass 166 are connected to the ground electrodes 164a, 164b arranged at both sides thereof by first elastic structures 171a, 171b and suspended over the substrate 161. Here, the first elastic structures 171a, 171b act as a linear spring defining a driving stroke of the movable mass, thereby enabling the movable mass 166 to move linearly by the driving stroke.

The first and second lever structures 175a, 175b are arranged in a straight line perpendicular to a moving direction of the movable mass 176. Second ends of the first and second lever structures 175a, 175b are adjacent to each other. In this embodiment, the first ends of the first and second lever structures 175a, 175b, which outwardly extend from the substrate 161, are connected to the movable mass 166 by second elastic structures 172a, 172b, respectively. The first and second lever structures 165a, 165b have respective fulcrums connected to supporting structures 165a, 165b fixed on the substrate 161 by third elastic structures 173a, 173b, respectively. The fulcrums are formed to be near the first ends of the lever structures. Because the fulcrums on the two lever structures 175a and 175b are distanced from each other, two supporting structures 165a and 165b are needed. The supporting structures 165a, 165b are coated with a metal which is the same material as the ground electrodes 164a, 164b, thereby being able to serve as a ground electrode.

The second ends of the first and second lever structures 175a, 175b, which are the opposite ends of the first ends are connected to the optical shutter 167 by third elastic structures 173a, 173b, respectively.

Here, the movable mass 166 having a width limited by the ground electrodes 164a, 164b arranged at both sides of the movable mass 166 should be connected to the second ends of the first and second lever structures 175a, 175b. However, there is a difficulty in connecting the second ends of the first and second lever structures 175a, 175b to the movable mass 166 by second elastic structures 172a, 172b, respectively, because the movable mass 166 has a narrow width.

To solve this problem, with reference to FIG. 6, there is provided with an extended structure 166a which is arranged in parallel with the first and second lever structures 175a, 175b and has the same length as the total of the lengths of the first and second lever structures 175a, 175b. Both outward ends of the extended structure 166a are connected to the first ends of the first and second lever structures 175a, 175b, respectively.

It is preferable that the first and second lever structures 175a, 175b are arranged bilaterally symmetrically on a virtual line connecting the optical shutter 167 and the center of the movable mass 166.

As described above, the MEMS variable optical attenuator in accordance with the present invention satisfies a need of small size as well as a need of a large displacement distance of the optical shutter, which is compatible with a large MFD of the optical collimator installed at the optical signal transmitting end or the optical signal receiving end of the optical fiber. Accordingly, the MEMS variable optical attenuator of the present invention may precisely attenuate an optical power of the optical beam by the desired amount even in the case that the optical signal transmitting end or the optical signal receiving end of the optical fiber has an optical collimator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An MEMS variable optical attenuator for attenuating an optical power of an optical beam by a variable amount of attenuation based on an electrical input signal comprising:
   a substrate having a planar surface;
   a pair of optical waveguides having an optical signal transmitting end and an optical signal receiving end, respectively, coaxially arranged on the substrate;
   a micro-electric actuator arranged on the substrate for providing a driving stroke along a direction perpendicular to an optical axis of the optical beam;
   at least one lever structure arranged on the substrate for receiving the driving stroke of the micro-electric actuator at a first end thereof and transferring an amplified displacement distance to an optical shutter through a second end thereof;
   an optical shutter arranged on the substrate and connected to the second end of the lever structure so as to be moved by the amplified displacement distance, thereby being displaced to an attenuation position of the optical beam.

2. The MEMS variable optical attenuator as set forth in claim 1, wherein the micro-electric actuator comprises:
   an electrostatic electrode section for generating an electrostatic force in response to the electrical input signal;
   a movable mass connected to the first end of the lever structure and moving along a direction perpendicular to the optical axis by the electrostatic force;
   a ground electrode section connected to the movable mass by a first elastic structure.

3. The MEMS variable optical attenuator as set forth in claim 2, further comprising a second elastic structure connecting between the movable mass and the lever structure.

4. The MEMS variable optical attenuator as set forth in claim 2, wherein the ground electrode section comprises two ground electrodes arranged at both sides of the movable mass, respectively.

5. The MEMS variable optical attenuator as set forth in claim 2, further comprising a supporting structure fixed on the substrate at an opposite side of the movable mass with respect to the lever structure, wherein the lever structure is arranged in perpendicular to a moving direction of the movable mass and arranged in a manner that a portion of the lever structure, which is near the first end of lever structure, is connected to the supporting structure.

6. The MEMS variable optical attenuator as set forth in claim 5, further comprising a third elastic structure connecting between the portion of the lever structure and the supporting structure.

7. The MEMS variable optical attenuator as set forth in claim 5, wherein the supporting structure is coated with a metal and used as a ground electrode.

8. The MEMS variable optical attenuator as set forth in claim 2, further comprising a supporting structure fixed on the substrate and arranged on an opposite side of the movable mass with respect to the lever structure, wherein the at least one lever structure includes a first lever structure and a second lever structure, which are arranged to be almost perpendicular to the moving direction of the movable mass, and portions of the first and second lever structures, which are near the respective first ends of the respective lever structures, are connected to the respective supporting structures.

9. The MEMS variable optical attenuator as set forth in claim 8, wherein the first lever structure and the second lever structure are arranged to be bilaterally symmetrical with respect to a virtual line connecting the optical shutter and the center of the movable mass.

10. The MEMS variable optical attenuator as set forth in claim 8, wherein the first ends of the first and second lever structures are adjacent to each other.

11. The MEMS variable optical attenuator as set forth in claim 10, wherein the first and second lever structures are connected to the same supporting structure.

12. The MEMS variable optical attenuator as set forth in claim 8, wherein the second ends of the first and second lever structures are adjacent to each other.

13. The MEMS variable optical attenuator as set forth in claim 8, further comprising second elastic structures connecting between the first ends of lever structures and the movable mass.

14. The MEMS variable optical attenuator as set forth in claim 8, further comprising third elastic structures connecting between the portions of the first and second lever structures, which are near the first ends of the first and second lever structures, and the supporting structures.

15. The MEMS variable optical attenuator as set forth in claim 8, further comprising fourth elastic structures connecting the optical shutter and the second ends of the lever structures.

16. The MEMS variable optical attenuator as set forth in claim 1, wherein the optical waveguides have optical collimators.

17. An MEMS variable optical attenuator for attenuating an optical power of an optical beam in response to an electronic input signal, comprising:
    a substrate having a planar surface;
    a pair of optical waveguides having an optical signal transmitting end and an optical signal receiving end, respectively, coaxially aligned with each other on the substrate;
    an electrostatic electrode section fixed on the substrate and generating an electrostatic force in response to the electronic input signal and;
    a movable mass arranged on the substrate and moving by the electrostatic force;
    a ground electrode section fixed on the substrate and connected to the movable mass by a first elastic structure;
    a lever structure arranged in perpendicular to a moving direction of the movable mass and having a first end connected to the movable mass via a second elastic structure and a second end opposite to the first end;
    a supporting structure arranged on an opposite side of the movable mass with respect to the lever structure and connected to a portion of the lever structure by a third elastic structure, the portion being adjacent to the first end of the lever structure; and
    an optical shutter arranged on the substrate and connected to the second end of the lever structure.

18. An MEMS variable optical attenuator for attenuating an optical power of an optical beam in response to an electronic input signal, comprising:
    a substrate having a planar surface;
    optical fibers having an optical signal transmitting end and an optical signal receiving end, respectively, coaxially aligned with the other on the substrate;
    an electrostatic electrode section fixed on the substrate and generating an electrostatic force in response to the electronic input signal and;
    a movable mass arranged on the substrate and moving by the electrostatic force;
    two ground electrodes fixed on the substrate, arranged at both sides of the movable mass respectively, and connected to the movable mass by respective first elastic structures;
    a first and second lever structures, each with a first end and a second end, arranged in perpendicular to a moving direction of the movable mass, the first ends of the first and second lever structures being connected to the movable mass by respective second elastic structures;
    a supporting structure arranged on an opposite side of the movable mass with respect to the first and second lever structures and connected to respective portions of the first and second lever structures by respective third elastic structures, the respective portions being near the respective first ends of the first and second lever structures; and
    an optical shutter arranged on the substrate and connected to the second ends of the first and second lever structures.

19. An MEMS variable optical attenuator for attenuating an optical power of an optical beam in response to an electronic input signal, comprising:
    a substrate having a planar surface;
    optical fibers having an optical signal transmitting end and an optical signal receiving end, respectively, coaxially aligned with each other on the substrate;
    an electrostatic electrode section fixed on the substrate and generating an electrostatic force in response to the electronic input signal and;
    a movable mass arranged on the substrate and moving by the electrostatic force;
    two ground electrodes fixed on the substrate, arranged at both sides of the movable mass, and connected to the movable mass by respective first elastic structures;
    first and second lever structures, each with a first end and a second end, arranged in perpendicular to a moving direction of the movable mass, the first ends of the first and second lever structures being connected to the movable mass by respective second elastic structures;
    two supporting structures arranged on an opposite side of the movable mass with respect to the first and second lever structures and connected to respective portions of the first and second lever structures by respective third elastic structures, the respective portions being near the respective first ends of the first and second lever structures; and
    an optical shutter arranged on the substrate and connected to the second ends of the first and second lever structures.

20. The MEMS variable optical attenuator as set forth in claim 19, wherein the movable mass includes an extended structure which is arranged in parallel with the first and second lever structures and has a length which is almost equal to the total lengths of the first and second lever structures, and the first ends of the first and second lever structures are connected to the movable mass by the third elastic structures.

* * * * *